United States Patent [19]

Mitchell et al.

[11] Patent Number: 4,628,887

[45] Date of Patent: Dec. 16, 1986

[54] AUTOMATICALLY OPENING CANISTER PURGE SOLENOID VALVE

[75] Inventors: Ronald F. Mitchell; John E. Cook, both of Chatham, Canada

[73] Assignee: Canadian Fram Limited, Chatham, Canada

[21] Appl. No.: 706,584

[22] Filed: Feb. 28, 1985

[51] Int. Cl.$^{4}$ ..................... F02M 33/02; G05D 16/18

[52] U.S. Cl. .................................... 123/520; 123/516; 137/907

[58] Field of Search ............... 123/516, 518, 519, 520, 123/521; 137/DIG. 8; 251/130, 139

[56] References Cited

U.S. PATENT DOCUMENTS

| | | | |
|---|---|---|---|
| 3,545,472 | 12/1970 | Franz | 137/DIG. 8 |
| 3,802,403 | 4/1974 | Dewick | 123/520 |
| 4,149,504 | 4/1979 | Walters | 123/520 |
| 4,245,592 | 1/1981 | Atkins | 123/520 |
| 4,377,146 | 3/1983 | Oniki | 123/520 |
| 4,395,991 | 8/1983 | Miyachi | 123/520 |
| 4,522,371 | 6/1985 | Fox | 137/DIG. 8 |

*Primary Examiner*—Carl Stuart Miller

*Attorney, Agent, or Firm*—Markel Seitzman; Russel C. Wells

[57] ABSTRACT

A canister purge valve comprising: a housing (12) including a vacuum chamber (14) communicated to an extending vacuum port (16) and an opening (26); an assembly (40) received within the housing (12) including a valve seat (76) positioned within the vacuum chamber (14) and an axially extending inlet port (58) extending through the opening (26) in said housing (12). The valve including a plurality of passages (57, 60, 62) communicating the inlet port (58) to the vacuum chamber (14); valve means (90, 92, 94, 96) movably positioned within the vacuum chamber (14) for seating upon the valve seat means for biasing (98) the valve means (90, 92, 94, 96) against the valve seat (76) and means for generating (42, 44, 52, 100, 120) a magnetic flux signal in response to control signals for urging the valve means to seat upon said valve seat (76).

17 Claims, 2 Drawing Figures

AUTOMATICALLY OPENING CANISTER PURGE SOLENOID VALVE

BACKGROUND AND SUMMARY OF THE INVENTION

The present invention generally relates to solenoid valves, and more particularly to an improved solenoid valve which varies the rate at which hydrocarbons can be removed from an evaporation canister and re-enter the intake manifold of an engine.

To eliminate the flow of hydrocarbons into the atmosphere, internal combustion engines use an evaporation canister which stores hydrocarbon vapors from within the engine and the fuel tank. Upon restarting the engine, the free hydrocarbons within the evaporation canister are returned to the intake manifold. In order to prevent an excessive amount of hydrocarbons from appearing in the exhaust when the engine is started, the rate at which the hydrocarbons are permitted to flow from the canister into the intake manifold is controlled by an electrically operated canister purge valve. Such valve can be of a normally closed or normally open variety. Normally open valves found in the prior art which remain open when no power is applied thereto require the use of a check valve to prevent vapor from flowing into the atmosphere while the engine is not running. The normally closed solenoid valve obviates the need for a check valve since such valves remain closed until control signals are communicated to the solenoid. However, the failure of such normally closed valves will cause the emission control system to fail to meet evaporative emission requirements by not being able to open and close at proper times.

It is an object of the present invention to eliminate those deficiencies found in the prior art. A further object of the present invention is to provide an automatically opening canister purge solenoid operated valve which is capable of a maximum flow of approximately 2.0 standard cubic feet per minute (56,634 cubic millimeters per minute) of air at a pressure differential of 10 inches (25.4 centimeters) of mercury.

A further object of the present invention is to provide a canister purge valve which opens automatically under the influence of intake manifold pressure thereby ensuring that hydrocarbons within the evaporation canister can be combusted within the engine regardless of the operable condition of an electrically energized coil.

A further object of the present invention is to provide a valve which is normally closed in the absence of any external influences.

A further object of the present invention is to provide a valve in which the rate at which hydrocarbons are permitted to re-enter the intake manifold is variable and electrically controlled.

Another object of the present invention is to provide a low cost, repeatably operating solenoid activated valve having an improved magnetic circuit.

Many other objects, purposes, features and advantages of the invention will be clear from the detailed description of the drawings.

Accordingly, the invention comprises a canister purge valve comprising a housing including a vacuum chamber communicated to an axially extending vacuum port and an opening; an assembly received within the housing including a valve seat positioned within the vacuum chamber. The assembly further including an axially extending outlet port extending through the opening in the housing and a plurality of passages communicating the outlet port to the vacuum chamber, the valve further including means for providing a seal between the housing and the assembly proximate the vacuum chamber, valve means movably positioned within the vacuum chamber for seating upon the valve seat for opening and closing communication between the inlet port and the outlet port, means for biasing the valve means against the valve seat, and means for generating a magnetic flux signal in response to control signals for urging the valve means to seat upon the valve seat.

DETAILED DESCRIPTION OF THE DRAWINGS

Figure 1:
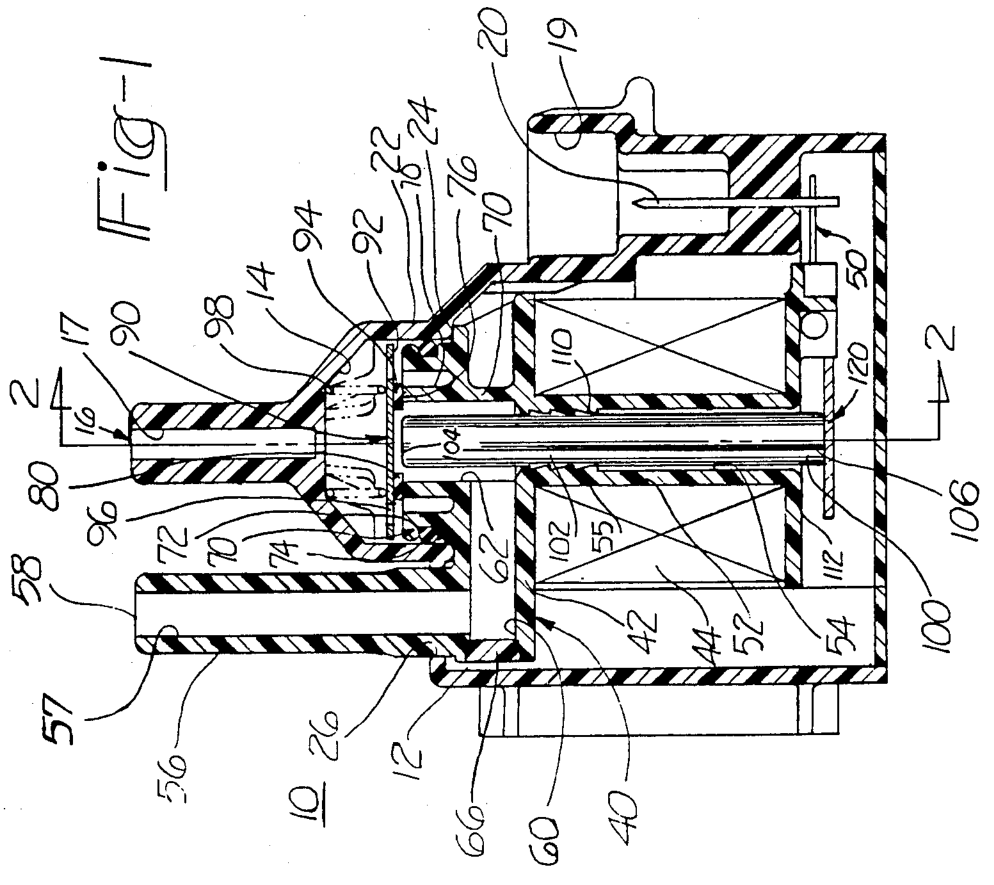
FIG. 1 illustrates a cross-sectional view of the present invention.

With reference to the accompanying FIGURES, there is illustrated an automatically opening canister purge valve 10 which includes a housing 12 that is preferably constructed of a non-magnetic, non-electric material such as plastic. The housing defines at its upper extreme as viewed in FIG. 1, a pressure chamber 14. The pressure chamber 14 is communicated to a source of vacuum such as the intake manifold of the engine through a vacuum port 16. The port is formed by a passage 17 within the housing 12. The passage includes an orifice such as the flat edge orifice 18. The housing 12 further includes an integrally molded electric connector 19 housing a plurality of electrical terminals 20. The walls 22 of the housing forming the vacuum port 16 and vacuum chamber 14 are provided with an annular shoulder 24. The housing is further provided with an opening 26, the purpose of which will be apparent from the description below. Fitted within the housing 12 is a coil and outlet port assembly generally designated as 40. The assembly 40 comprises a bobbin or carrier 42 The carrier 42 comprises an axially extending cylindrical wall or member 52 defining a central stepped passage 54. An electromagnetic coil 44 is wound about the member 52. The ends of the coil 44 are connected by way of connectors 50 to the terminals 20. It should be noted that only one of the coil connectors 50 can be seen in FIG. 1.

Integrally molded as part of the assembly 40 and axially extending from the carrier 42 is a member 56 having a passage 57 therein forming an outlet port 58. The inlet port 58 is adapted to be communicated in a known manner with the evaporative emissions collection canister of the vehicle. The lower end of the axially extending passage 57 intersects a radially extending passage 60 which terminates at an axially extending bore or passage 62 having a diameter preferably greater than the larger diameter portion of passage 54. The end of passage 60 opposite bore 62 is closed by plug or insert 66 which may be ultrasonically welded in place.

The bore 62 is formed by an upraised boss generally designated as 70 which is formed as an integral extension of the assembly 40. The boss 70 includes a circumferentially extending notch 72 which supports an O-ring 74. The boss 70 extends into the vacuum chamber 14 and the O-ring 74 provides for sealing against the housing 12. The boss 70 terminates at an annular flat valve seat 76 positioned about passage 62 within the vacuum chamber 14. Moveably positioned within the vacuum chamber 14 is a flat ferro-magnetic disk 90 supporting on its underside 92 a ring 94 of compliant material such as rubber for seating upon the valve seat 76 which when seated thereon closes communication between the vacuum port 16 and the input port 58. The disk 90 is preferably circular and includes a plurality of openings 96. The disk 90 is biased towards the valve seat 76 by a spring 98.

Positioned within the bore 54 is a ferro-magnetic metal stator 100. The stator 100 comprises a plurality of outwardly directed barbs 102 preferably positioned thereon such when the stator 100 is positioned within the bore 54 its end 104 is slightly above the valve seat 76 with the barbs 102 engaging the upper narrow portion 55 of the member 52. This narrowing portion 55 of the stepped bore 54 permits the barbs 102, upon insertion therein, to deform the member 52 to hold the stator 100 in its desired orientation. The stator 100 further comprises an end 106 which extends from the lower portion 112 of the cylindrical member 52. Positioned in contacting engagement with the end 104 of the stator 100 is a ferro-magnetic strap generally designated as 120. The interaction of the metallic strap 120, assembly 40 and housing 12 is more clearly illustrated in FIG. 2.

The strap 120 comprises a substantially flat piece of metal bent to form a U-shaped member having a bottom 122 and a plurality of sides **124*a* and 124*b*. The sides 124*a* and 124*b* terminate at ends 126*a* and 126*b* which are received within narrow slots 128*a* and 128*b* fabricated within the housing 12. The strap 120 may be secured to the housing 12 by providing the ends 126*a* and 126*b* with outwardly extending barbs which deform the walls of the cooperating slots 128. The barbs are not visible in the drawings. Upon assembly of the various components of the valve 10 within the housing 12, a potting compound 130 may be inserted into the housing 12 to secure the assembly 40 and strap 120 permanently in place. An end cap 132 may be provided to enclose the open end 134** of the housing.

During assembly of the valve 10, the assembly 40 is inserted within the open end 134 of the housing 12 and is fitted against the shoulder 24. The axially extending member 56 defining the inlet port 58 is received through the opening 26 in the housing 12. By incorporating the inlet port 58 as part of the assembly 40, rather than fabricating the inlet port 58 as part of the housing, as done in the prior art, eliminates the requirement to provide vacuum seals within the housing 12 proximate the passage 57 of the inlet port 58.

Figure 2:
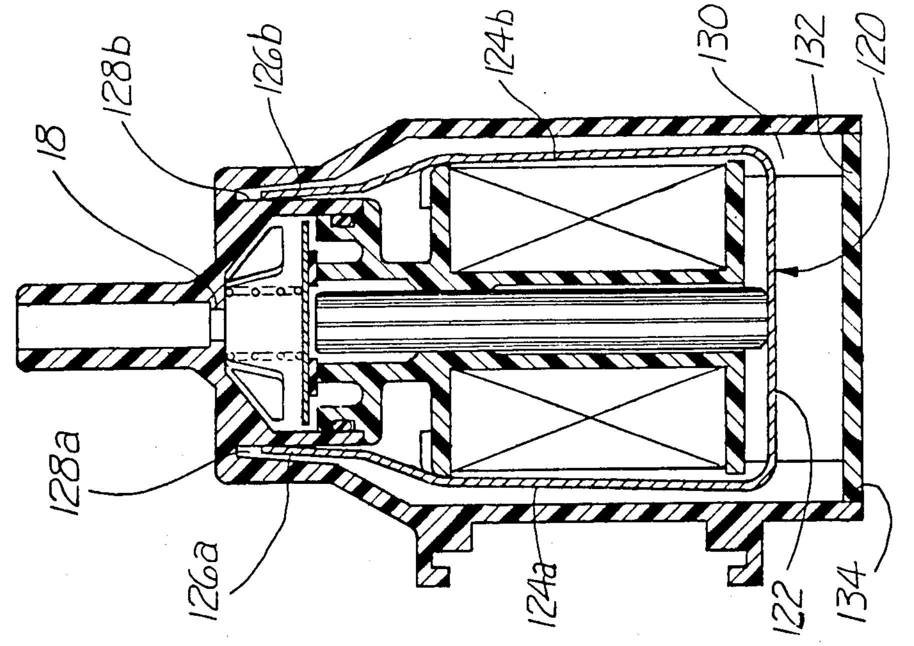
FIG. 2 illustrates another cross-sectional view of the invention taken through section 2—2 of FIG. 1.

The slots 128 within the housing 12 are positioned such that when the strap 120 is in place against the stator 100, the ends 126 of the sides 124 extend above, as viewed in FIG. 2, the disk 90.

The coil 44, stator 100, strap 120 and disk 90 form the preferred magnetic circuit of the valve 10 through which metallic flux will flow upon activation of the coil 44 in response to controlled signals communicated thereto. By positioning the ends of the strap 126 above the disk 90 the magnetic flux is directed to flow through the disk 90 and stator 100 thereby improving the repeatability of the operation of the valve 10.

Many changes and modifications in the above-described embodiment of the invention can, of course, be carried out without departing from the scope thereof. Accordingly, that scope is intended to be limited only by the scope of the appended claims.

What is claimed is:

1. A canister purge valve comprising:

a housing including a vacuum port, a vacuum chamber connected to said vacuum port, and an opening remote from said vacuum port and said vacuum chamber;

an assembly comprising a carrier, said carrier including a passage formed within a cylindrical member thereof, and a coil wound about said member adapted to receive control signals, said assembly further comprising a member extending into said vacuum chamber including an end surface defining a valve seat and an axially directed first passage extending through said member, said valve seat positioned about said first passage, at least one other passage extending from said first passage and terminating at an inlet port, said inlet port extending through said opening in said housing, a ferromagnetic metal stator received within said stepped bore and loosely received within said first passage, said stator including an end positioned proximate said valve seat;

a movable flat valve positioned within said vacuum chamber, said flat valve including a first surface supporting a ring of compliant material defining a sealing surface for seating upon said valve seat;

means for biasing said valve against said valve seat; and means for providing a seal between said housing and said assembly proximate said vacuum chamber.

2. The valve as defined in claim 1 wherein said flat valve is moved off from said valve seat when a vacuum pressure signal of a predetermined magnitude is applied to said vacuum port and selectively seated upon seat valve under the combined influences of said vacuum pressure signal, said biasing means and a magnetic force generated upon activation of said coil by said control signals.

3. The valve as defined in claim 2 wherein said member proximate said stepped bore is fabricated of a compliant material and wherein said stator comprises a plurality of outwardly extending barbs which engage the narrow portion of said stepped bore as said stator is inserted therethrough for positioning said stator relative to said member.

4. The valve as defined in claim 1 wherein said flat valve includes a plurality of openings positioned in surrounding relation relative to said ring.

5. The valve as defined in claim 1 wherein the end of said stator extends slightly beyond said valve seat such that when said ring carried by said flat valve seats upon said valve seat said end is positioned slightly below said flat valve.

6. The valve as defined in claim 1 wherein said sealing means comprises an O-ring fitted between the outer circumference of said member and the walls of said housing.

7. The valve as defined in claim 1 wherein said stator includes another end extending from said assembly, and further includes means for defining a preferred path for magnetic flux to flow including a magnetically conductive member having a bottom in contacting engagement with said another end of said stator and sides extending therefrom positioned adjacent said assembly and extending substantially parallel to said passage, said sides terminating at ends above said flat valve.

8. The valve as defined in claim 7 wherein said bottom and said sides are substantially flat.

9. The valve as defined in claim 1 further including an orifice between said vacuum chamber and said vacuum port.

10. A canister purge valve comprising:

a housing including a vacuum port, a vacuum chamber connected to said vacuum port, and an opening remote from said vacuum port and said vacuum chamber;

an assembly comprising a carrier, said carrier including a passage formed within a cylindrical member thereof, and a coil wound about said member adapted to receive control signals, said assembly further comprising a member extending into said vacuum chamber including an end surface defining a valve seat and an axially directed first passage extending through said member, said valve seat positioned about said first passage, at least one other passage extending from said axial first passage and terminating at an inlet port, said outlet port extending through said opening in said housing, a metal stator received within said stepped bore and loosely received within said first passage, said stator including an end positioned proximate said valve seat;

a movable flat valve positioned within said vacuum chamber, said flat valve including a first surface supporting a ring of compliant material defining a sealing surface for seating upon said valve seat;

means for biasing said valve against said valve seat;

means for providing a seal between said housing and said assembly proximate said vacuum chamber; and means for defining a preferred magnetic flux path for directing said magnetic flux to flow through said stator and flat valve.

11. The valve as defined in claim 10 wherein said flat valve is moved off from said valve seat when a vacuum pressure signal of a predetermined magnitude is applied to said vacuum port and selectively seated upon seat valve under the combined influences of said vacuum pressure signal, said biasing means and a magnetic force generated upon activation of said coil by said control signals.

12. The valve as defined in claim 10 wherein said member proximate said stepped bore is fabricated by a compliant material and wherein said stator comprises a plurality of outwardly extending barbs which engage the narrow portion of said stepped bore as said stator is inserted therethrough for positioning said stator relative to said member.

13. The valve as defined in claim 10 wherein said flat valve includes a plurality of openings positioned in surrounding relation relative to said ring.

14. The valve as defined in claim 10 wherein the end of said stator extends slightly beyond said valve seat such that when said ring carried by said flat valve seats upon said valve seat said end is positioned slightly below said flat valve.

15. The valve as defined in claim 10 wherein said sealing means comprises an O-ring fitted between the outer circumference of said member and the walls of said housing.

16. The valve as defined in claim 10 wherein said stator includes another end extending from said assembly, and wherein said flux directing means includes a magnetically conductive member having a bottom in contacting engagement with said another end of said stator and sides extending therefrom positioned adjacent said assembly and extending substantially parallel to said passage, said sides extending and terminating at ends above said ring.

17. The valve as defined in claim 16 wherein said bottom and said sides are substantially flat.

* * * * *